Oct. 26, 1926.
J. B. HATHAWAY
1,604,912
GRAIN THRASHING MACHINE
Filed Oct. 11, 1922
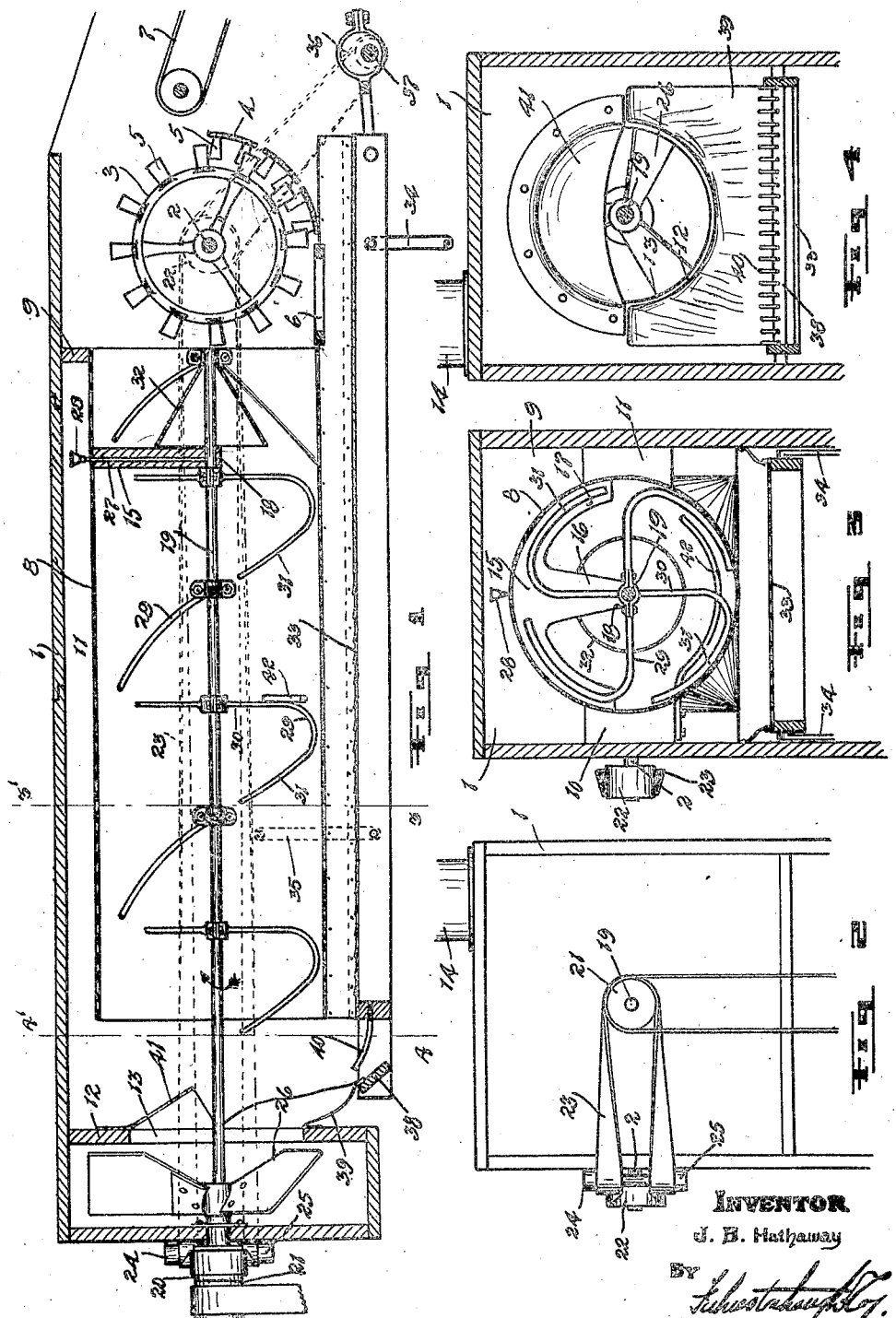
INVENTOR.
J. B. Hathaway Patented Oct. 26, 1926.

1,604,912

UNITED STATES PATENT OFFICE.

JUNIUS BRUCE HATHAWAY, OF BRANDON, MANITOBA, CANADA.

GRAIN-THRASHING MACHINE.

Application filed October 11, 1922. Serial No. 593,870.

The invention relates to improvements in grain thrashing machines and particularly in improvements to that type of thrashing machine as disclosed in my prior application, Serial No. 248,667, filed the 29th day of November, 1920, and the general object of the present invention is to provide certain improvements which will materially increase the efficiency of the machine and particularly designed to produce a rapid and efficient initial separation of the grain from the straw and whilst maintaining a comparatively small machine of large capacity.

A more specific object is to provide an improved pair of combination beating and feeding arms, which co-operate with the perforated drum, in which they operate, to effectively feed and break up the straw, separate the grain therefrom and throw it outwardly and also to keep the interior of the drum clean and prevent the perforations of the same from being clogged.

A further object of the invention is to provide a combined guard and distributer to prevent the passing straw from becoming lodged on the bearings and also to spread the straw as it is being passed into the drum.

A further object of the invention is to provide a suction fan which will gather the straw discharged from the drum and deliver it through the stacker or discharge spout and to associate with the fan casing a guard plate which will prevent the fan from drawing its air from the top of the drum and make it draw the air from the bottom.

A still further object is to associate fingers with the drum which will act to prevent the beating and feeding arms from passing the straw too rapidly through the drum particularly where damp or tough straw is encountered.

With the above more important objects in view the invention consists essentially in the arrangement and construction of parts hereinafter more particularly described and later pointed out in the appended claims, reference being had to the accompanying drawing in which:

Fig. 1 is a longitudinal sectional view through the upper part of the machine.

Fig. 2 is a view of the rear end of the machine.

Fig. 3 is a vertical sectional view at 3—3' Fig. 1, and looking forwardly.

Fig. 4 is a vertical sectional view at 4—4' Fig 1, and looking rearwardly.

In the drawing like characters of reference indicate corresponding parts in the several figures.

The body 1 of the machine is in the form of a closed casing which is provided forwardly with a main cross shaft 2 carrying the cylinder 3, the cross shaft being driven in any suitable manner, such as by a driving belt. Adjoining the cylinder I locate concaves 4, the cylinder and concaves being supplied with the customary teeth 5. A grid 6 is located adjacent the concaves and beneath the cylinder. These latter parts are of ordinary construction and are utilized to break up and feed the straw to the drum later described.

An elevator 7, or self feeder as it is customarily called, is supplied to feed the sheaves which have to be thrashed to the cylinder, the sheaves being fed by the conveyor one at a time, head on, to the cylinder.

In the present application, however, I do not wish to be limited to the precise means herein shown for feeding straw to the drum as, obviously, any suitable devices could be utilized to accomplish this work, provided the straw is initially broken up and fed to the drum in sufficient quantity to supply the capacity of the drum.

To the rear of the cylinder and within the body or casing I locate a stationary perforated cylindrical drum 8 which is adapted to receive the straw thrown back by the cylinder.

The forward end of the drum has the lower part thereof flared so that it is the full width of the cylinder at the bottom and it is carried by a partition 9 and suitably positioned saddles 10 permanently secured to the drum and the casing.

In order to give a better idea of the parts I might mention that I have constructed a machine wherein the cylinder is twenty four inches in diameter and eighteen inches long and with this I utilize a drum twenty six inches in diameter and six feet long. The casing is of such interior dimension that there is a grain collecting chamber 11 around the drum. The rear end of the drum is open and is directly opposite a fan casing 12 located at the rear end of the machine, the casing presenting a comparatively large inlet opening 13 opposite the drum and a discharge opening communicating with the grain stacker or discharge spout 14.

To the drum, and in a location somewhat back from the front end thereof I secure a bracket 15, the bracket presenting a downwardly extending arm 16 and a semi-circular foot piece 17, which latter is securely fastened to the drum.

The lower end of the arm 16 is provided with a bearing 18 which supports a lengthwise extending shaft 19 which extends rearwardly through the drum and through the fan casing and is provided at the rear end of the machine with two pulleys 20 and 21.

The shaft 2 is provided exteriorly of the casing with a driving pulley 22 and a belt 23 connects the pulley 22 with pulley 20, the driving belt being passed around suitable guide pulleys 24 and 25 located at one of the rear corners of the machine body. The pulley 21 is utilized for driving other parts of the machine not herein shown.

A suction fan 26 is secured to the shaft 19 and is contained within the fan casing and it operates to gather the separated chaff and such like and deliver the same to and through the discharge spout.

The bracket 15 is provided with a grease tube 27 communicating with a grease cup 28 permitting of the proper lubrication of the bearing 18. To the shaft 19 I secure combination beating and feeding arms 29 which are arranged in pairs and have the pairs spaced apart an equal distance throughout the length of the shaft. The beating and feeding arms are all identically constructed, each presenting a radially directed portion 30 extending from the shaft and a trailing spirally curved portion 31, which latter is adapted in the rotation of the shaft, not only to feed the straw rearwardly, but also to sweep the inner surface of the drum, thereby maintaining the same clean and preventing the clogging of the apertures thereof. The adjoining pairs of arms 29 alternate in position, being placed ninety degrees apart and the trailing ends 31 of the arms are so arranged that when rotating they cover the entire inner surface of the drum. It will here be observed that the first pair of arms 29 is secured to the front end of the shaft 19 and that the second pair of said arms is positioned immediately to the rear of the bracket 15.

In order to prevent the possibility of straw accumulating on the bracket I have provided a cone shaped guard 32 which has the small end permanently secured to the front end of the shaft and the rear or large end just nicely clear of the bracket. The guard rotates with the shaft 19 and serves to spread the straw at the front end of the drum and also to prevent the accumulating of straw around the bearing 18 and at the point where the second pair of arms 29 is attached to the shaft.

Underneath the drum and cylinder I locate a combination grain pan and chaffer 33 which is mounted for forward and back oscillatory movement, being carried by forward hangers 34 and rearward hangers 35 and it is actuated by an eccentric disc 36 carried by a suitably driven cross shaft 37 mounted in the forward end of the machine. The forward portion of the member 33 is in the form of a nonperforated pan, whilst the rear portion thereof is provided with openings which will permit of the falling through of grain and the passing back of straw, chaff, and such like. Rearwardly the member 33 carries a deflecting board 38 and a flexible canvas throat 39 connects the deflecting board 38 with the fan casing.

Spaced fingers 40 are located rearwardly of the combination pan and chaffer, being positioned in advance of the board 38. These fingers serve to catch loose straw and such like thrown back over the rear end of the chaffer and hold the same such that it will be caught up in the air passing to the fan.

A deflector 41 is secured to the fan casing at the top side of the opening 13, such deflector being provided to prevent the fan from drawing air from the top part of the drum and materially increasing the upward air draft in the area adjoining the rear part of the combined grain pan and chaffer.

This machine is operated at a comparatively high speed, the shaft 19 revolving at approximately seven hundred and fifty revolutions per minute. When in operation the sheaves are fed by the conveyor, head on, to the cylinder and are broken up by the cylinder and concave teeth and thrown backwardly into the front end of the drum. At this point the straw is caught by the forward pair of arms 29 and is forcibly thrown outwardly, this action being intensified by the guard 32 which revolves with the shaft, the shaft turning in the direction indicated by the applied arrow.

In the drum the action of the arms 29 is such that the grain is thrown outwardly by centrifugal force through the perforations of the drum and the straw is fed rearwardly, the trailing ends of the arms also acting to keep the perforations clean. The grain, passing to the chamber 11 drops down by gravity and lodges on the combined grain pan and chaffer. All the grain, and other small material, lodging on the combined grain pan and chaffer is worked rearwardly by the oscillating movement of the combined pan and chaffer and the grain passes through the chaffer and falls down and is further cleaned by a shoe, not herein shown. Any light material passing over the rear end of the combined pan and chaffer is lodged on the fingers 40 and is caught by the up air draft to the fan 26 and blow out the stacker or discharge pipe, together with the straw expelled by the arms 29 from the rear end of the drum.

I have found that this type of thrashing machine is very efficient in making the initial separation and that it has a large capacity, although a comparatively small machine when compared with existing machines.

I wish to particularly point out that the arrangement and shape of the arms 29 is exceedingly important as they not only have to serve to throw the grain out by centrifugal force, but they have also to pass the straw rearwardly and maintain the drum perforations clean as otherwise the grain could not pass through and an efficient, initial separation could not be effected.

I have found that where damp or tough straw is encountered there is a possibility of the combination beating and feeding arms passing the straw too rapidly through the drum and in order to retard the straw I supply spaced bowed spring fingers 42 which extend transversely across the lower side of the drum and operate to retard the passing straw. One or more fingers can be used as desired, being placed at suitable intervals throughout the length of the drum and they are preferably mounted so that they can be taken out when wished.

What I claim as my invention is:

1. In a grain thrashing machine, the combination with a stationary perforated drum, a driven shaft passing lengthwise and centrally through the drum and spaced pairs of feeding and sweeping arms permanently secured to the shaft and spiralling rearwardly of the drum, of spring fingers extending transversely across the lower side of the drum and free of the revolving arms and adapted to retard the passage of the straw through the drum under the influence of the arms.

2. In a grain thrashing machine, the combination with a stationary perforated drum, a driven shaft passing lengthwise and centrally through the drum and spaced pairs of feeding and sweeping arms permanently secured to the shaft and spiralling rearwardly of the drum, of downwardly bowed spring fingers extending transversely across the lower side of the drum and free of the revolving arms and adapted to retard the passage of the straw through the drum under the influence of the arms.

3. In a grain thrashing machine, the combination with a stationary perforated drum, means for forcibly feeding straw into one end of the drum, a driven shaft passing lengthwise of the drum, and pairs of spaced combination beating and feeding arms secured to the shaft and operating within the drum, of a deflector secured to the shaft to the rear of the first pair of arms and adapted to spread the passing straw outwardly toward the drum.

4. In a grain thrashing machine, the combination with a stationary perforated drum, means for forcibly feeding straw into one end of the drum, a driven shaft passing lengthwise of the drum, and pairs of spaced combination beating and feeding arms secured to the shaft and operating within the drum, of a cone shaped deflector secured to the forward end of the shaft between the forward and following pairs of arms, said deflector being designed to spread the passing straw toward the inner side of the drum.

5. In a grain thrashing machine, the combination with a stationary perforated drum, a driven shaft passing lengthwise centrally through the drum, pairs of spaced combination feeding and beating arms secured to the shaft and means for forcibly feeding straw into the forward end of the drum, of a bearing bracket permanently secured to the drum and extending downwardly within the same and rotatably supporting the forward end of the shaft in a location to the rear of the foremost pair of arms, and a combined cone shaped deflector and guard secured to the forward end of the shaft in a location to the rear of the foremost pair of arms and in advance of the bracket.

6. In a grain thrashing machine, the combination with the delivery end of a stationary perforated drum, of a suction fan opposite the delivery end of the drum and a deflector associated with the fan casing and preventing the fan from drawing air from the upper part of the drum.

Signed at Brandon this 4th day of May 1922.

JUNIUS BRUCE HATHAWAY.